US012330429B2

(12) United States Patent
Kondo

(10) Patent No.: US 12,330,429 B2
(45) Date of Patent: Jun. 17, 2025

(54) PRINTING DEVICE

(71) Applicant: Brother Kogyo Kabushiki Kaisha, Nagoya (JP)

(72) Inventor: Kei Kondo, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 221 days.

(21) Appl. No.: 18/162,354

(22) Filed: Jan. 31, 2023

(65) Prior Publication Data

US 2023/0173824 A1 Jun. 8, 2023

Related U.S. Application Data

(63) Continuation of application No. PCT/JP2021/012877, filed on Mar. 26, 2021.

(30) Foreign Application Priority Data

Jul. 31, 2020 (JP) ................................ 2020-131086

(51) Int. Cl.
*B41J 2/325* (2006.01)
*B41J 2/32* (2006.01)
(Continued)

(52) U.S. Cl.
CPC ................ *B41J 2/325* (2013.01); *B41J 2/32* (2013.01); *B41J 2/33505* (2013.01); *B41J 29/02* (2013.01); *B41J 29/38* (2013.01)

(58) Field of Classification Search
CPC ..... B41J 2/32; B41J 2/325; B41J 15/04; B41J 2200/30; B41J 2200/31; B41J 29/02;
(Continued)

(56) References Cited

U.S. PATENT DOCUMENTS 5,447,379 A * 9/1995 Pou ............................ B41J 3/36
400/120.16
5,657,066 A * 8/1997 Adams .................. B41J 25/316
347/198
(Continued)

FOREIGN PATENT DOCUMENTS

JP 2010-253905 A 11/2010
JP 2018-202630 A 12/2018
(Continued)

OTHER PUBLICATIONS

May 28, 2024—(EP) Extended EP Serach Report—EP App 21850643.4.

(Continued)

*Primary Examiner* — Leslie J Evanisko
*Assistant Examiner* — Thomas Ray Knief
(74) *Attorney, Agent, or Firm* — Banner & Witcoff, Ltd.

(57) ABSTRACT

A printing device includes a base plate extending in a direction orthogonal to a first direction, a mounting portion provided rotatably on a surface, which is at one side in the first direction, of the base plate, in which a ribbon roll having an ink ribbon wound is to be mounted on the mounting portion, a thermal head provided on the surface of the base plate, and configured to perform printing on a printing medium disposed on one side in a second direction orthogonal to the first direction; and a printed circuit board located on one side, with respect to the base plate, in a third direction orthogonal to the first direction and the second direction, and extending in a direction intersecting the base plate.

6 Claims, 13 Drawing Sheets

(51) Int. Cl.
*B41J 2/335* (2006.01)
*B41J 29/02* (2006.01)
*B41J 29/38* (2006.01)

(58) Field of Classification Search
CPC . B41J 29/023; B41J 29/04; B41J 29/12; B41J 29/13
USPC ................................ 347/171, 211, 217, 222; 400/120.01–120.18
See application file for complete search history.

(56) References Cited

U.S. PATENT DOCUMENTS 7,042,478 B2 * 5/2006 Bouverie ............. B41J 11/0095 347/177
10,507,680 B2 12/2019 Deng
2019/0118551 A1 4/2019 Hojo
2019/0118568 A1 * 4/2019 Deng ....................... B41J 35/28

FOREIGN PATENT DOCUMENTS

JP 2019-077109 A 5/2019
JP 2019-077111 A 5/2019
KR 2007-0072735 A 7/2007

OTHER PUBLICATIONS

Oct. 17, 2023—(JP) Notice of Reasons for Refusal—JP App 2020-131086, Eng Tran.
May 25, 2021—International Search Report—Intl App PCT/JP2021/012877.
Jan. 31, 2023—International Preliminary Report on Patentability and Written Opinion—Intl App PCT/JP2021/012877, Eng Tran.

* cited by examiner

PRINTING DEVICE

REFERENCE TO RELATED APPLICATIONS

This is a continuation application of International Application No. PCT/JP2021/012877 filed on Mar. 26, 2021 which claims priority from Japanese Patent Application No. 2020-131086 filed on Jul. 31, 2020. The entire contents of the earlier applications are incorporated herein by reference.

BACKGROUND ART

A related art discloses a printing device that performs printing on a printing medium such as a packaging material conveyed by a conveying machine. The printing device includes a thermal head and a partition wall which are fixed to a base plate. The partition wall partitions an area on a front side with respect to the base plate into an upper first area and a lower second area. The thermal head is disposed in the second area. The thermal head heats an ink ribbon and performs printing on a printing medium passing below the printing device.

DESCRIPTION

In the above printing device, when various operations on the thermal head (for example, replacement of the thermal head) are performed, an operator accesses the thermal head from above the printing device. However, in this case, there is a problem in that the operability of the operator is poor because the partition wall becomes an obstacle. Therefore, it is preferable that various members constituting the printing device are not disposed above the thermal head in order to facilitate the operations of the operator.

An object of the present disclosure is to provide a printing device that allows an operator to easily perform various operations on a thermal head.

A printing device according to the present disclosure includes: a base plate extending in a direction orthogonal to a first direction; a mounting portion provided rotatably on a surface, which is at one side in the first direction, of the base plate, in which a ribbon roll having an ink ribbon wound is to be mounted on the mounting portion; a thermal head provided on the surface of the base plate, and configured to perform printing on a printing medium disposed on one side in a second direction orthogonal to the first direction; and a printed circuit board located on one side, with respect to the base plate, in a third direction orthogonal to the first direction and the second direction, and extending in a direction intersecting the base plate.

In the printing device according to the present disclosure, the printed circuit board is not disposed on the other side in the second direction with respect to the thermal head. Therefore, the printing device can prevent the printed circuit board from becoming an obstacle in a case where an operator accesses the thermal head from the other side in the second direction to perform various operations. Therefore, the printing device can facilitate the operations performed on the thermal head by the operator.

Figure 5:
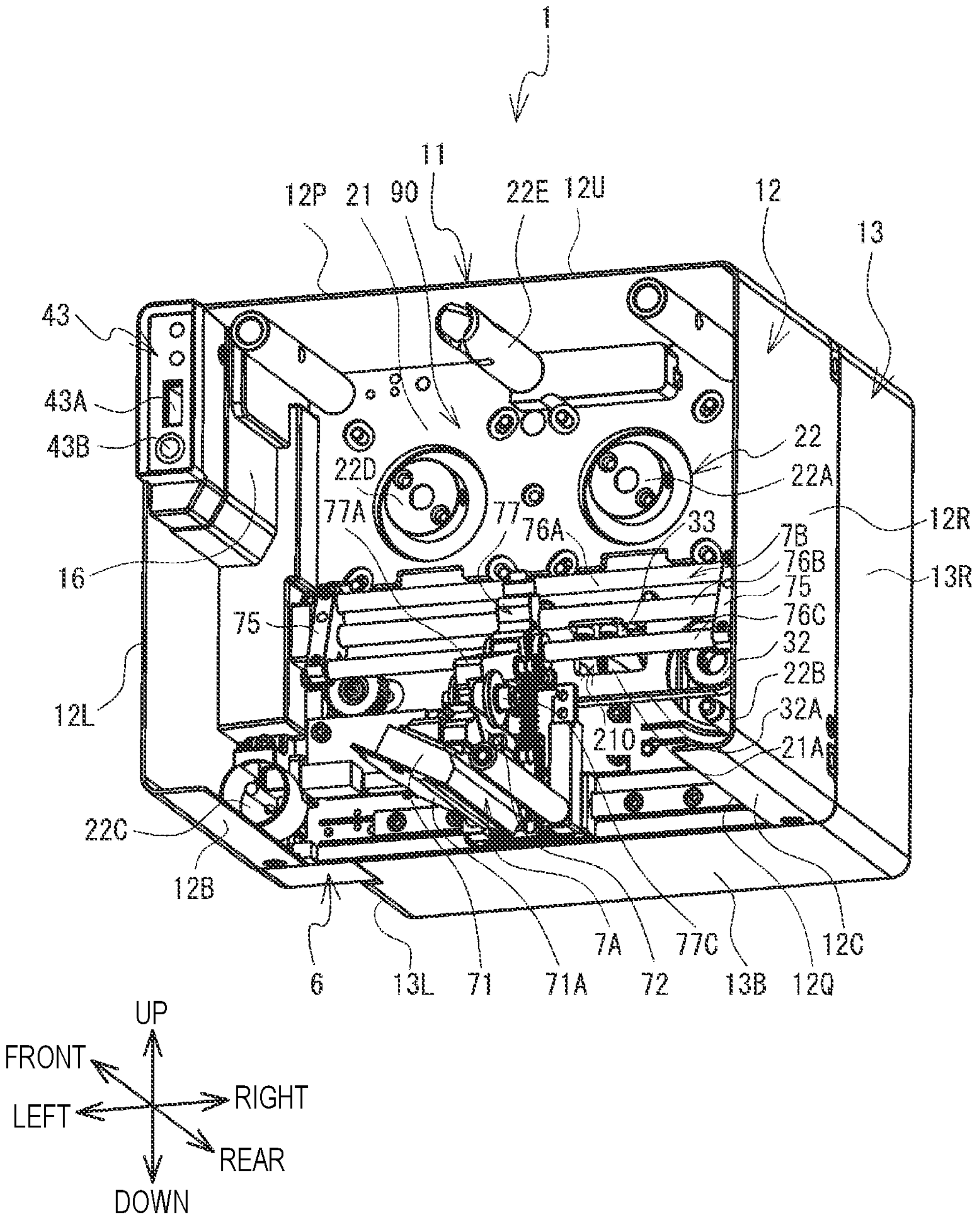

FIG. 5 is a perspective view of the printing device 1 (without the ribbon cartridge 9 and with a cover 16).

Figure 6:
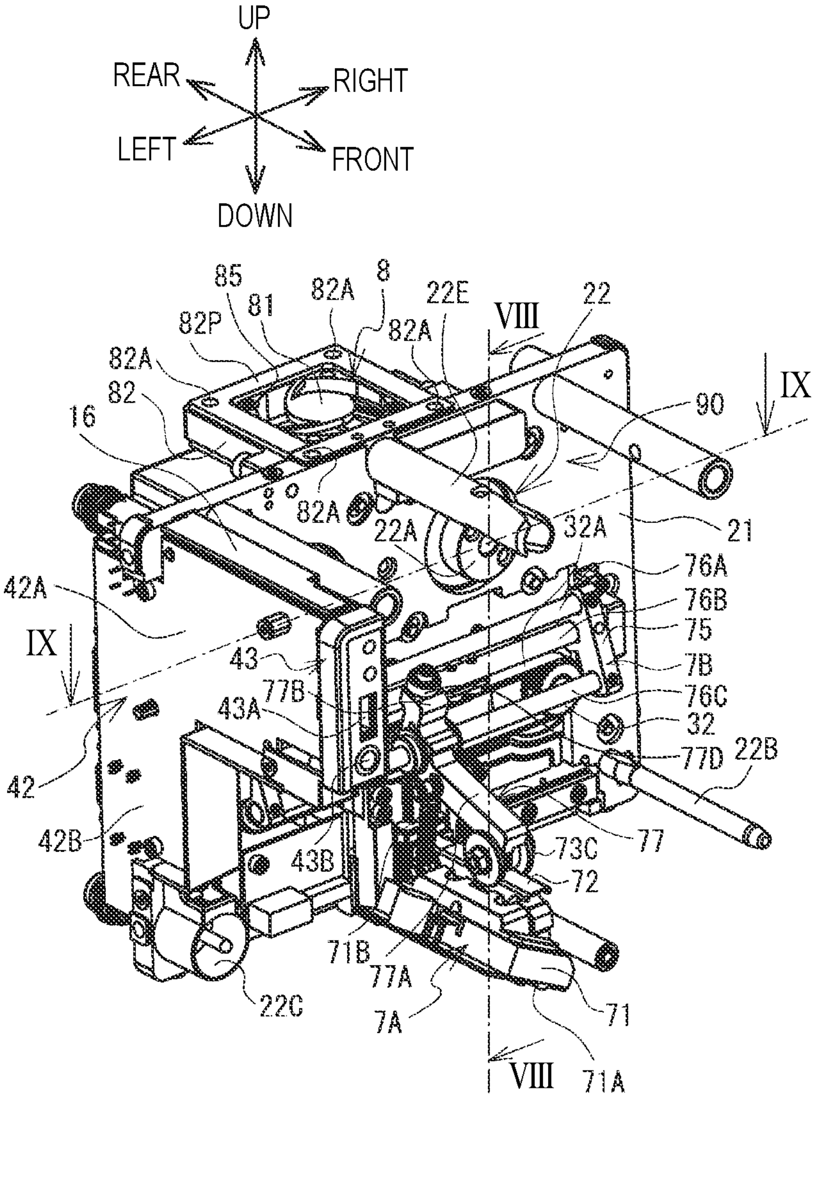

FIG. 6 is a perspective view of the printing device 1 (without a housing 11 and with the cover 16).

Figure 7:
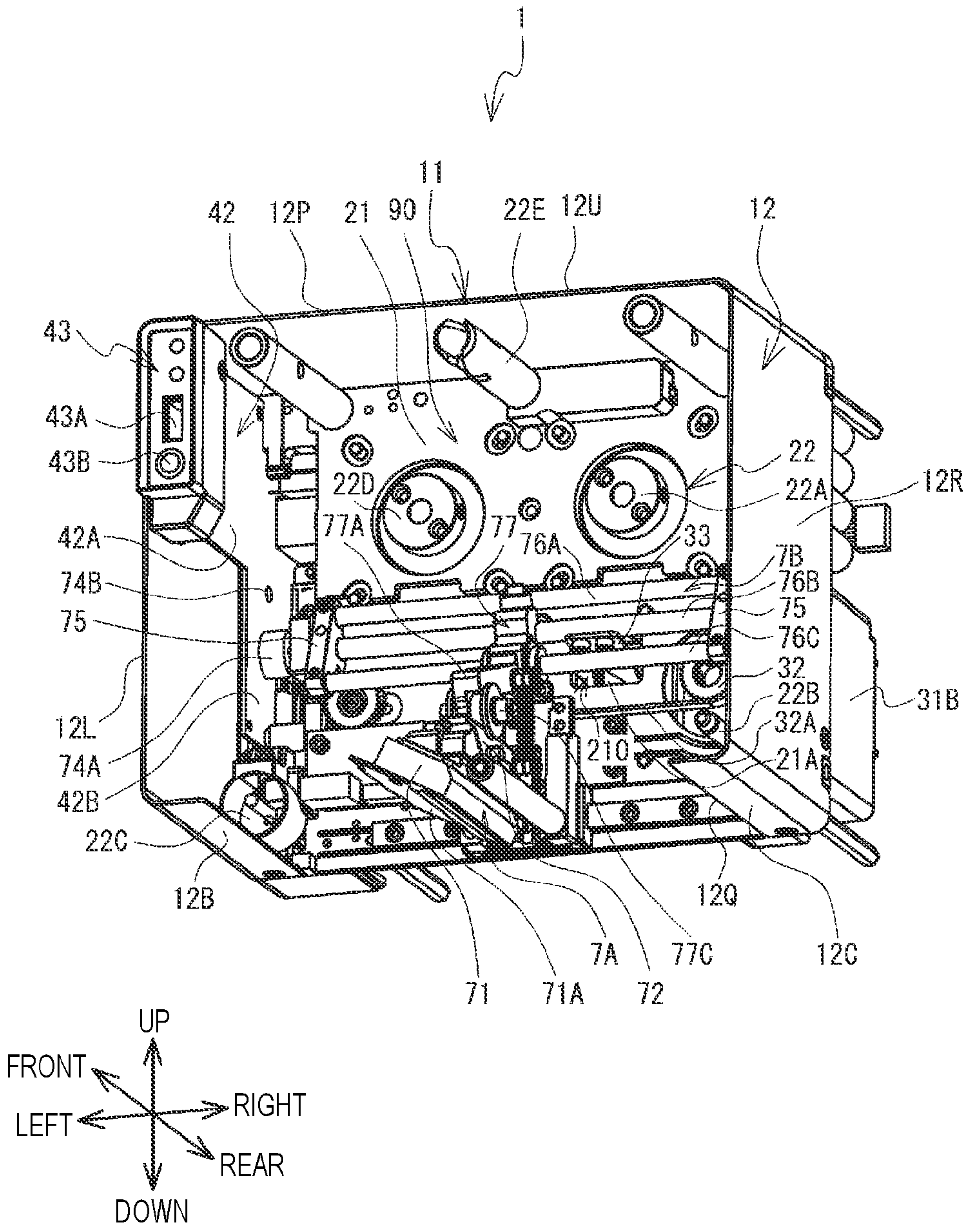

FIG. 7 is a perspective view of the printing device 1 (without a second housing 13 and the cover 16).

Figure 8:
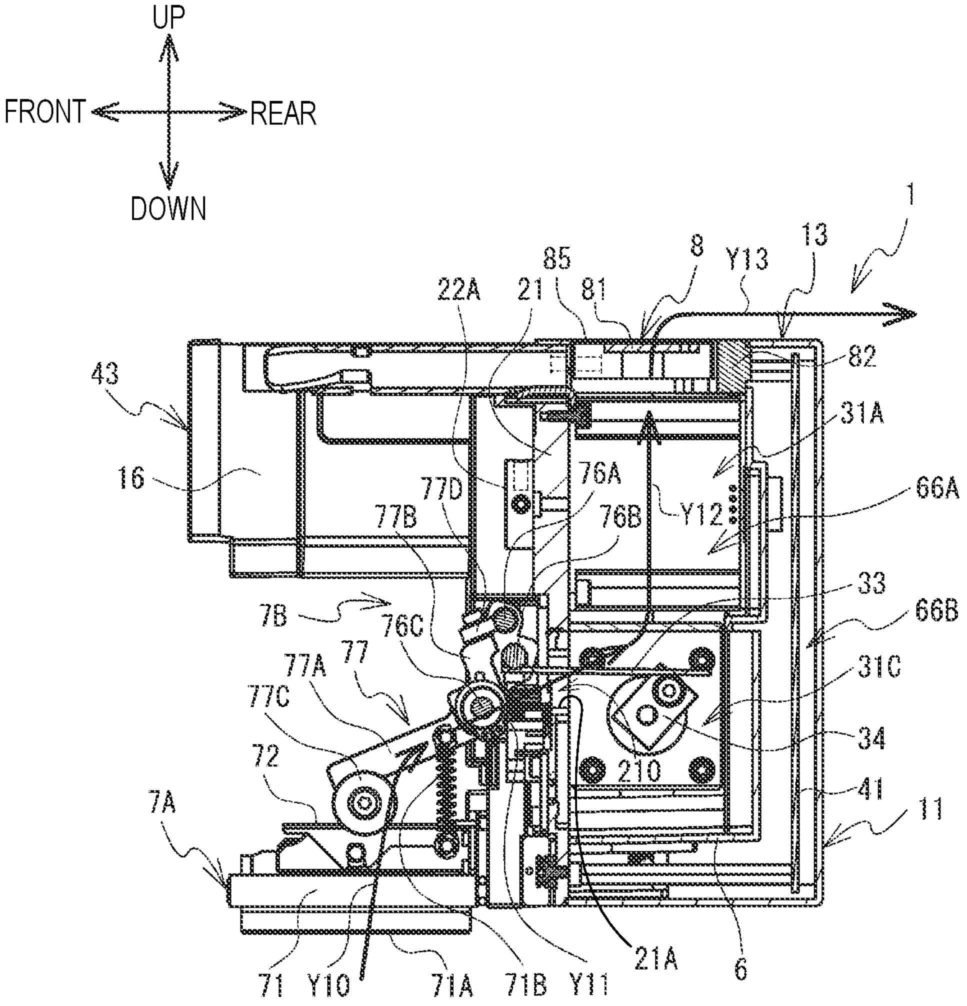

FIG. 8 is a cross-sectional view taken along a line VIII-VIII in FIG. 6 as viewed in a direction of arrows (without a first housing 12 and with the second housing 13).

Figure 9:
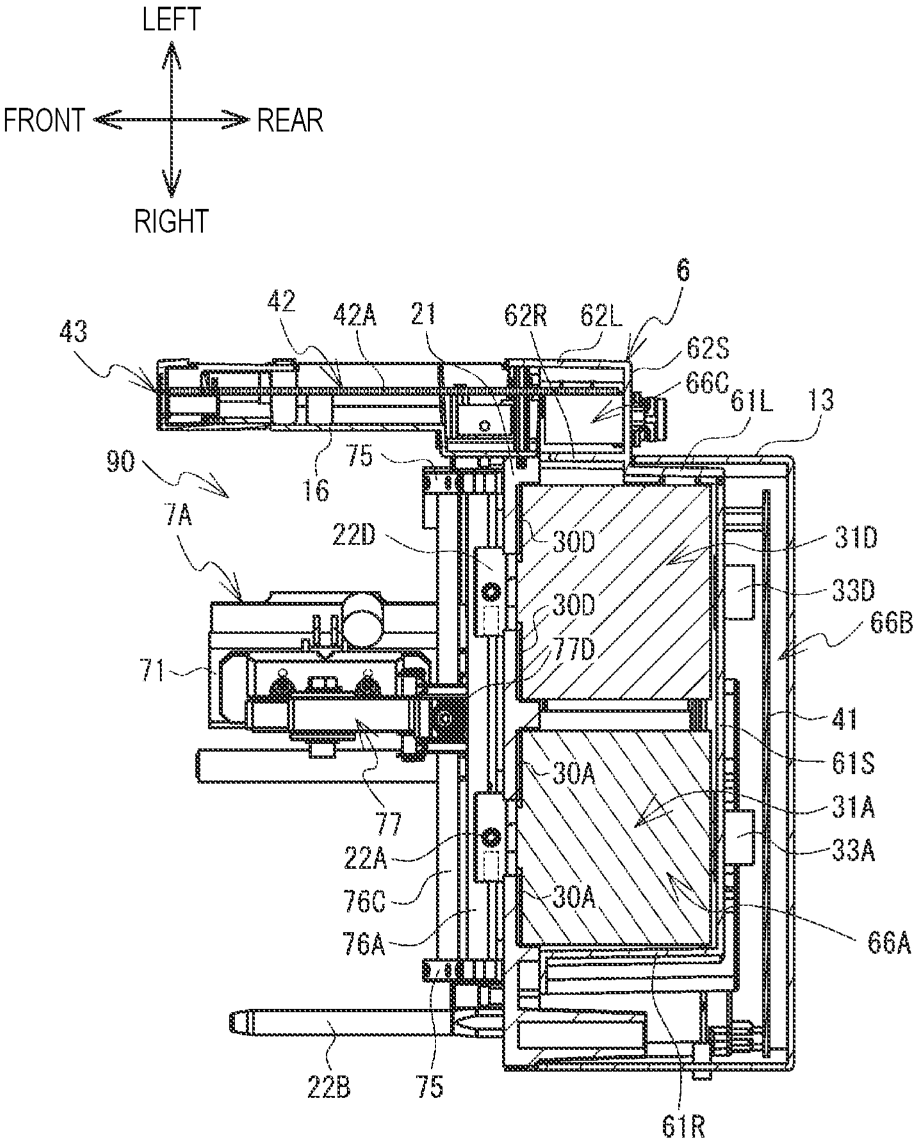

FIG. 9 is a cross-sectional view taken along a line IX-IX in FIG. 6 as viewed in a direction of arrows (without the first housing 12 and with the second housing 13).

Figure 10:
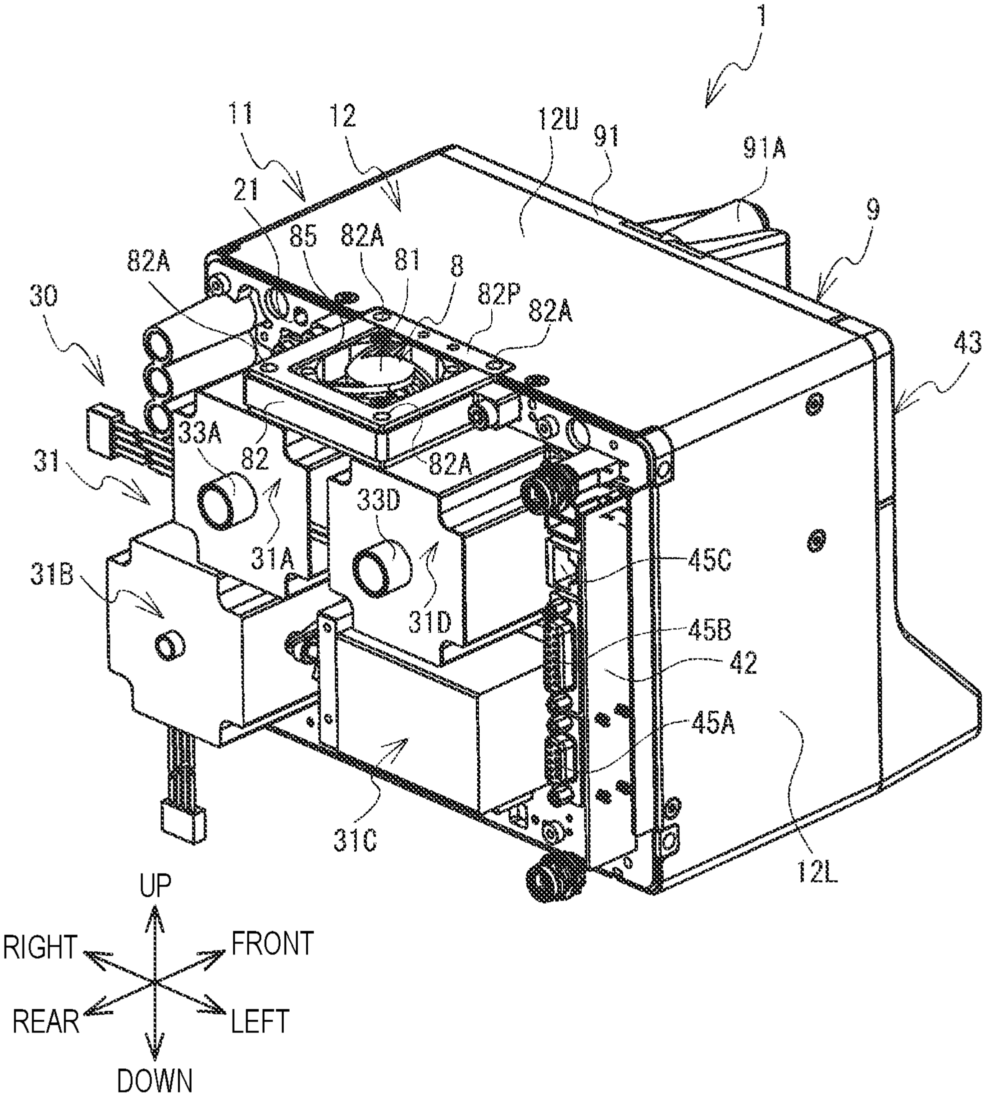

FIG. 10 is a perspective view of the printing device 1 (without the second housing 13, a control board 41, and a cover 6).

Figure 11:
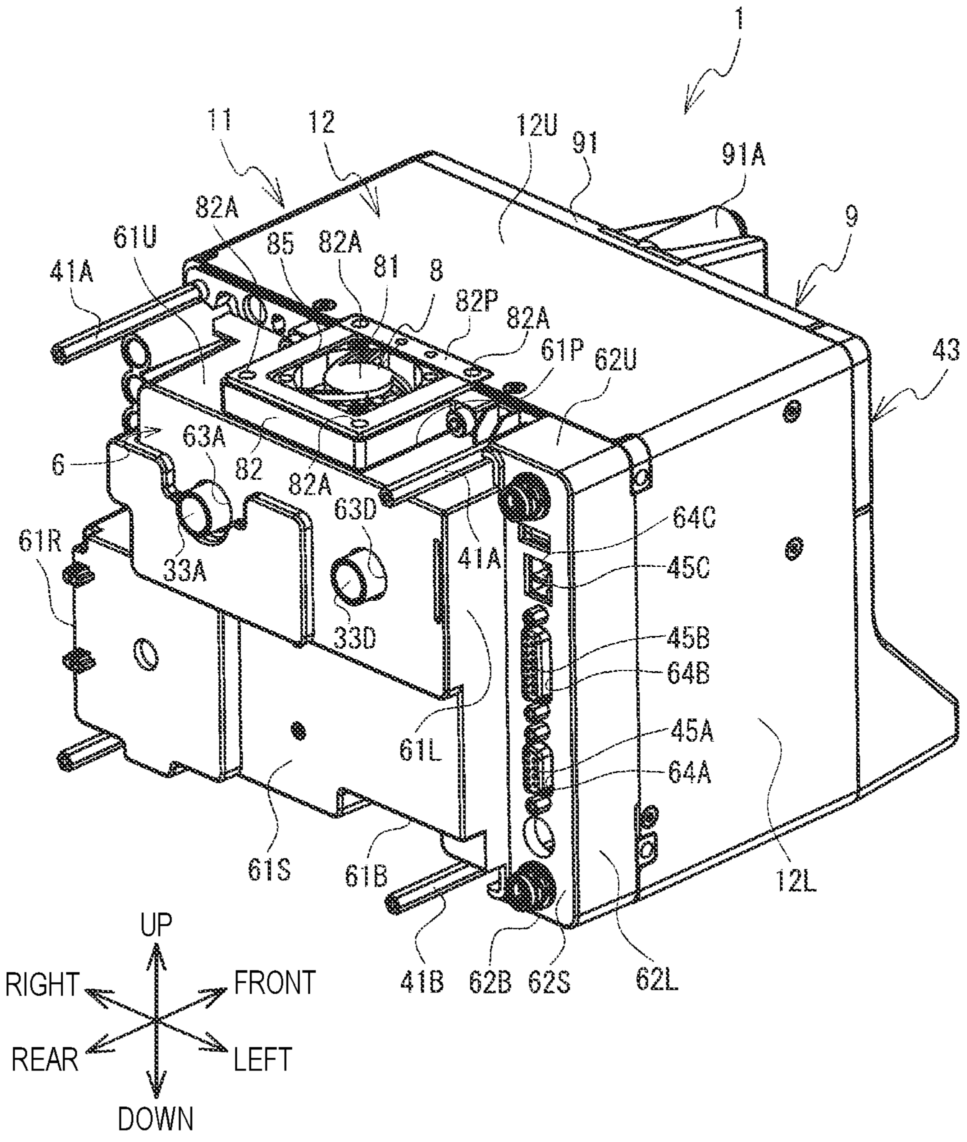

FIG. 11 is a perspective view of the printing device 1 (without the second housing 13 and the control board 41, and with the cover 6).

Figure 12:
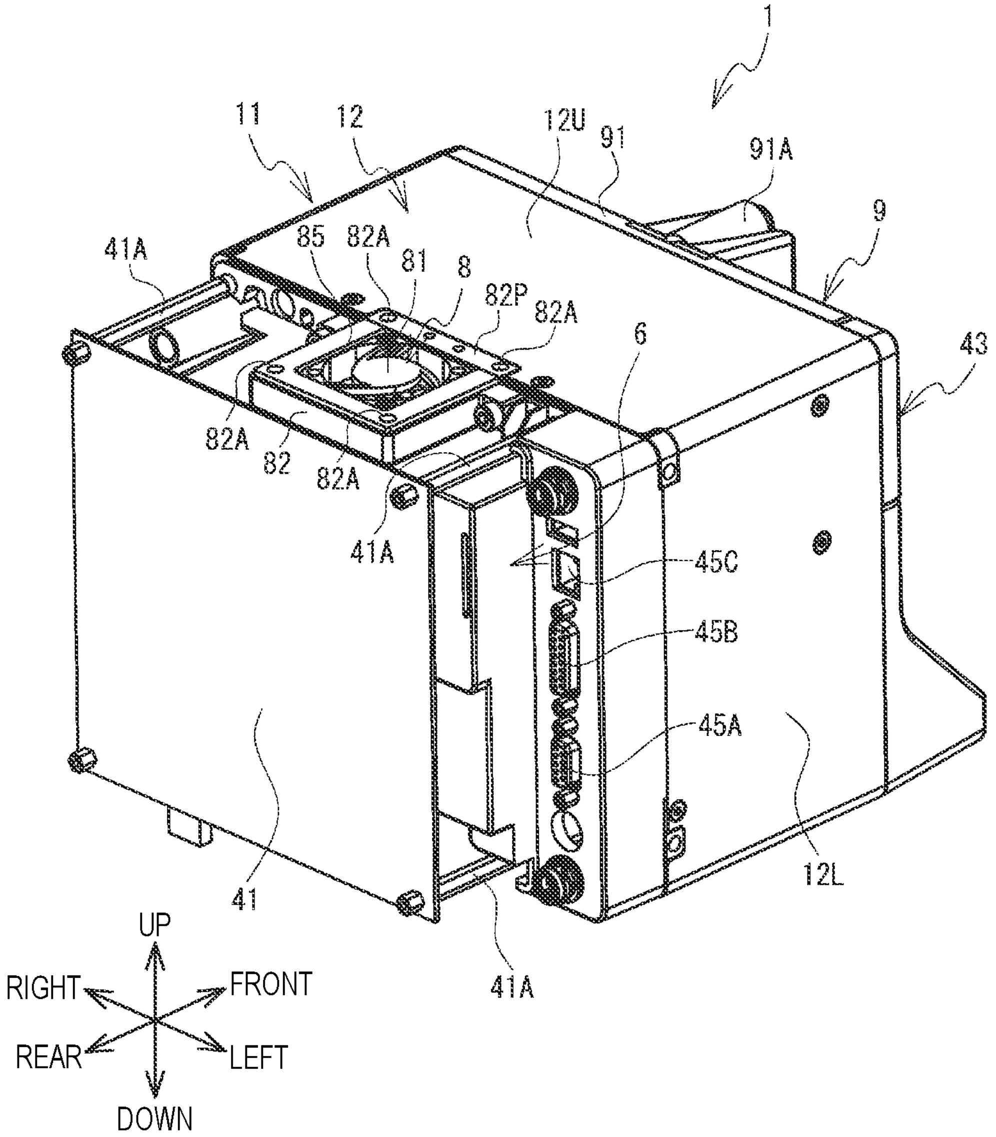

FIG. 12 is a perspective view of the printing device 1 (without the second housing 13, and with the control board 41 and the cover 6).

Figure 13:
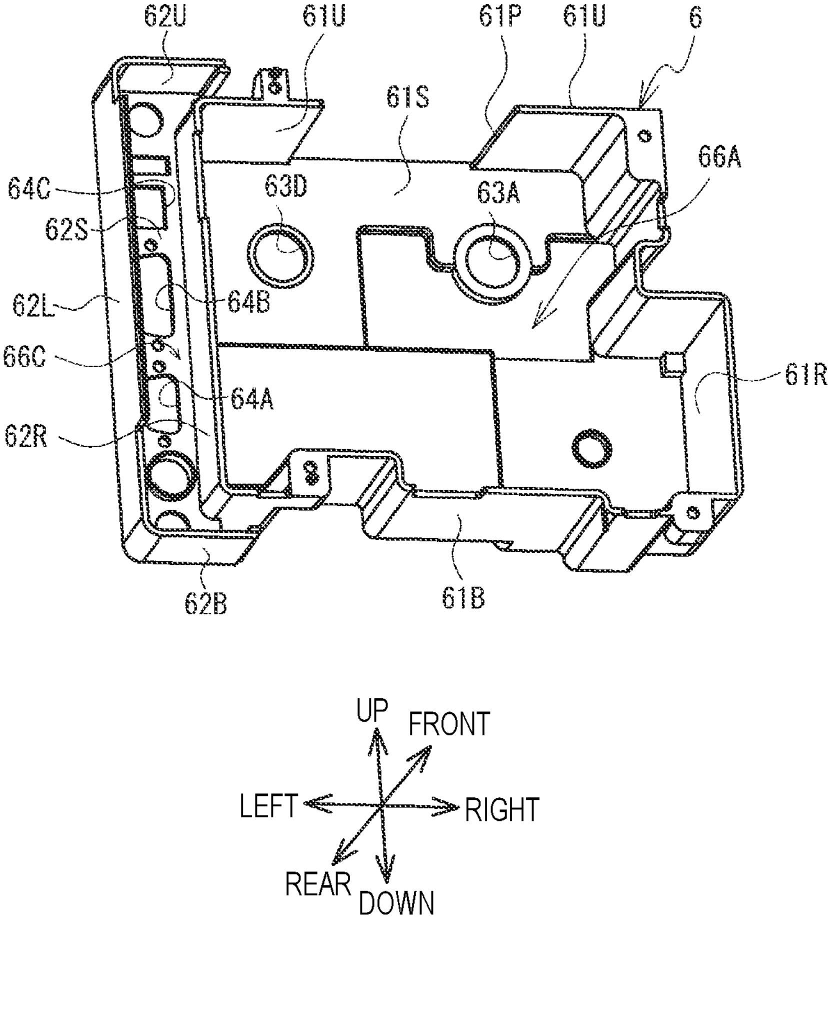

FIG. 13 is a cross-sectional view of the cover 6.

<Overview of Printing System 50>

Figure 1:
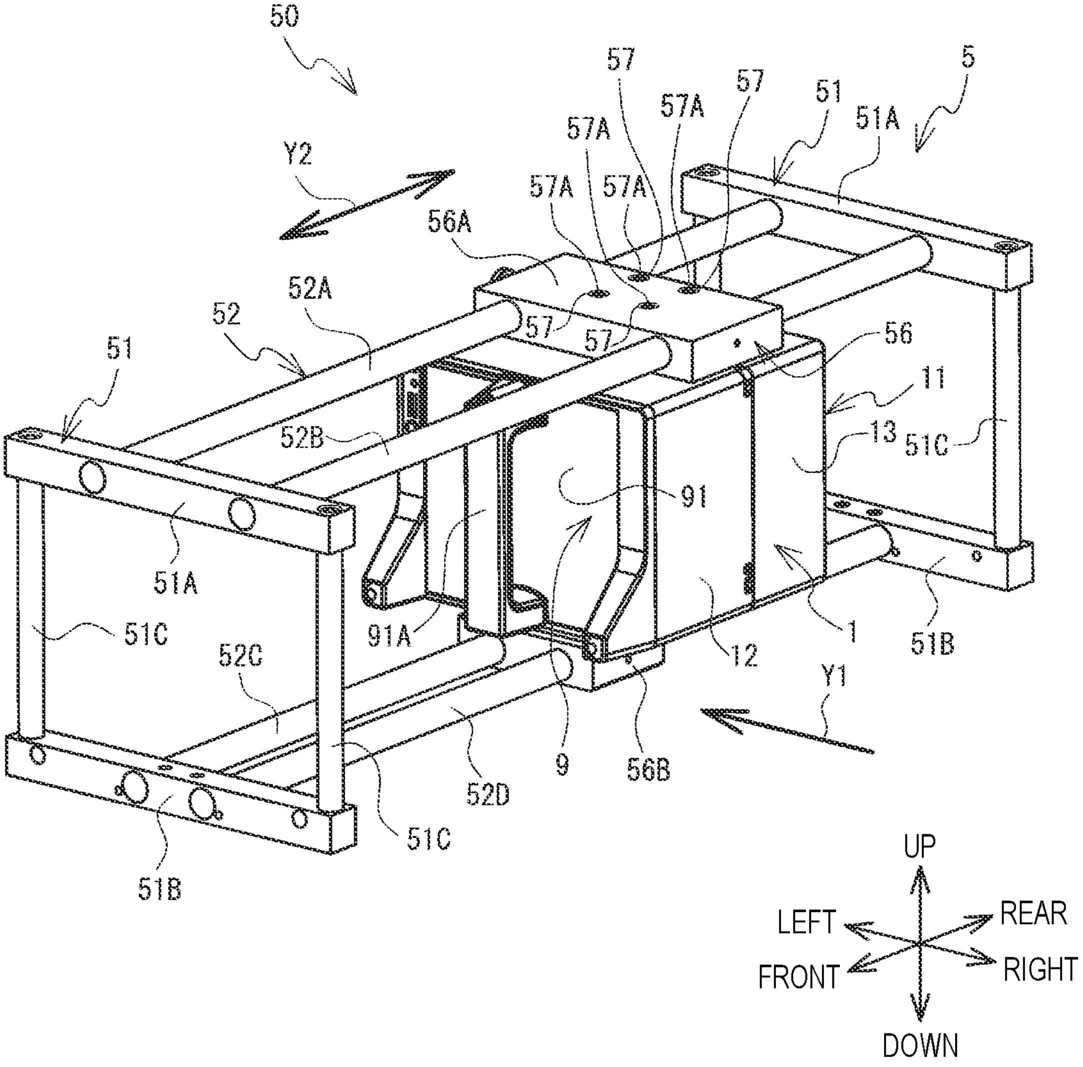
FIG. 1 is a perspective view of a printing system 50 as viewed from the front.
Figure 2:
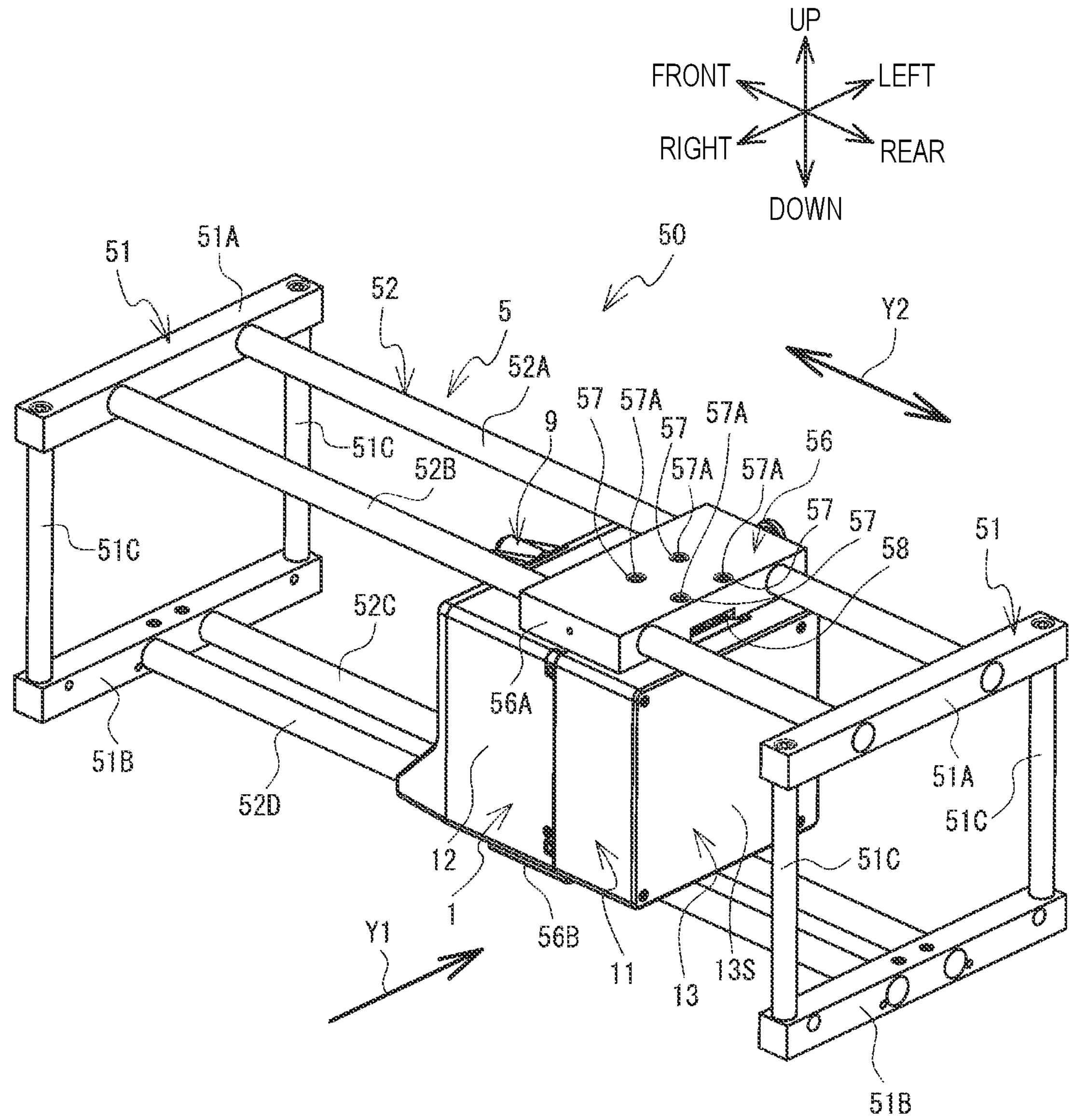
FIG. 2 is a perspective view of the printing system 50 as viewed from the rear.

An embodiment of the present disclosure will be described with reference to the drawings. A printing system 50 is a system for performing thermal transfer printing. The printing system 50 performs printing on a printing medium conveyed by an external device that is not shown. A specific example of the external device is a packaging machine that conveys a packaging material. In this case, for example, the printing system 50 is used by being incorporated in a part of a conveyance line along which the printing medium is conveyed by the packaging machine. As shown in FIGS. 1 and 2, the printing system 50 includes a printing device 1 and a moving mechanism 5.

Hereinafter, in order to facilitate understanding of the description of the drawings, an upper side, a lower side, a left side, a right side, a front side, and a rear side of each configuration included in the printing system 50 are defined. An upper side, a lower side, a left side, a right side, a front side, and a rear side of each of the printing device 1, the moving mechanism 5, and a ribbon cartridge 9, which will be described later, correspond to an upper side, a lower side, an obliquely upper left side, an obliquely lower right side, an obliquely lower left side, and an obliquely upper right side in FIG. 1, respectively. In FIG. 1, a conveyance direction of the printing medium coincides with a left-right direction. The printing medium is conveyed from a right side to a left side below the printing device 1 by the external device (arrow Y1 (see FIGS. 1 and 2)).

Figure 3:
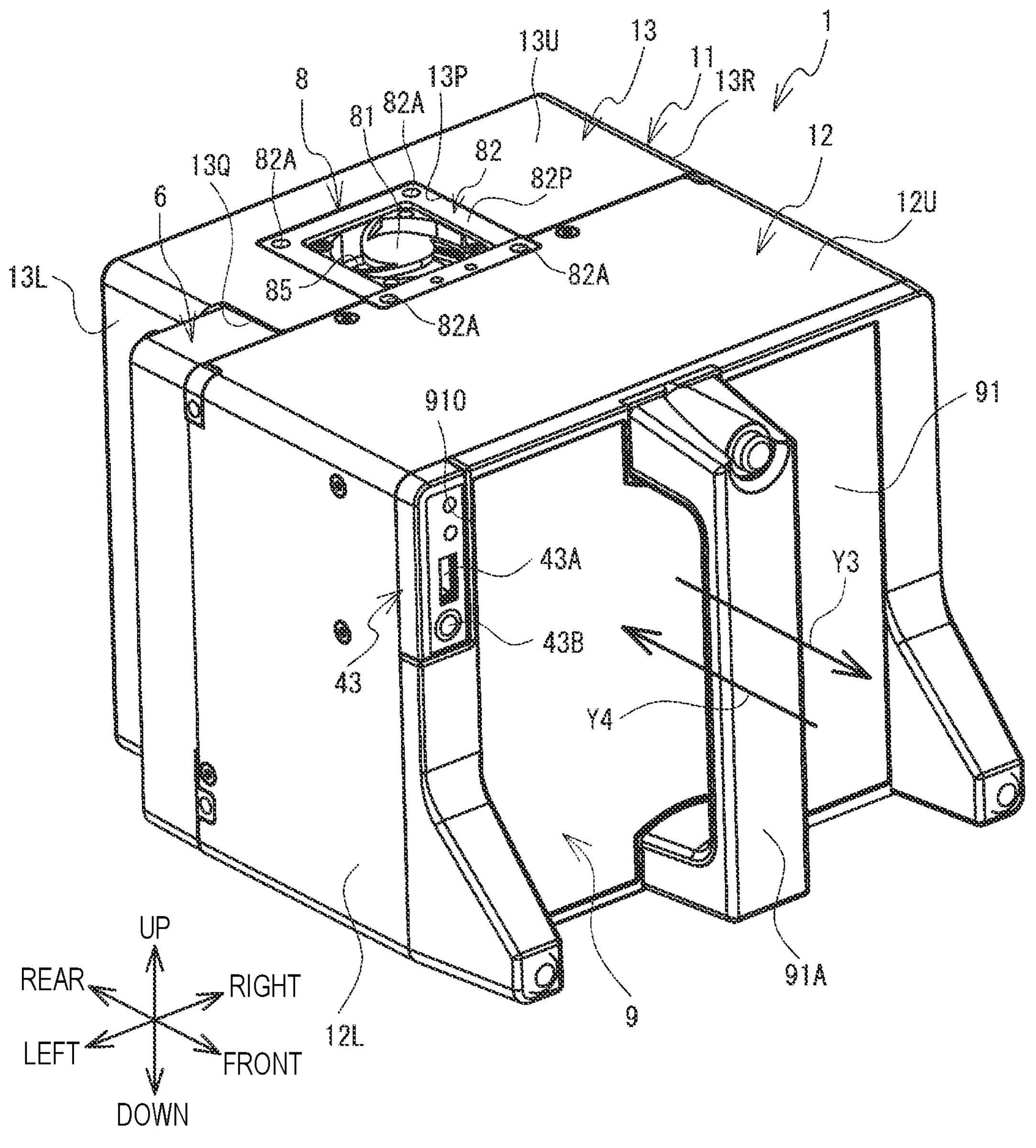
FIG. 3 is a perspective view of a printing device 1 (with a ribbon cartridge 9).

As shown in FIGS. 1 to 3, the printing device 1 has a substantially rectangular parallelepiped shape. The ribbon cartridge 9 (see FIG. 4), which will be described later, is detachably mounted on the printing device 1. The printing device 1 feeds out an ink ribbon 9A (see FIG. 4) from a ribbon roll 90A (see FIG. 4) of the mounted ribbon cartridge 9, and heats the ink ribbon 9A by a thermal head 7A (see FIG. 5 and the like). Accordingly, the printing is performed on the printing medium conveyed below the printing device 1.

As shown in FIGS. 1 and 2, the moving mechanism 5 includes a pair of frame bodies 51, a guide rail 52, and a holding portion 56. The pair of frame bodies 51 are separated from each other in a front-rear direction. Each frame body 51 includes an upper support portion 51A, a lower support portion 51B, and a pair of bridge portions 51C. Each of the upper support portion 51A and the lower support portion 51B has a prismatic shape and extends in the left-right direction. The upper support portion 51A and the lower support portion 51B are separated from each other in an up-down direction. The upper support portion 51A is disposed above the lower support portion 51B. The pair of bridge portions 51C each have a columnar shape and extend in the up-down direction. The pair of bridge portions 51C are bridged between both end portions of the upper support portion 51A and both end portions of the lower support portion 51B in the left-right direction.

The guide rail 52 includes four columnar bodies extending in the front-rear direction. Hereinafter, the respective columnar bodies are referred to as guide rails 52A, 52B, 52C, and 52D. The guide rails 52A and 52B are bridged between the upper support portions 51A of the pair of frame bodies 51. The guide rail 52A is located on a left side with respect to the guide rail 52B. The guide rails 52C and 52D are bridged between the lower support portions 51B of the pair of frame bodies 51. The guide rail 52C is located on a left side with respect to the guide rail 52D.

The holding portion 56 includes a device holding portion 56A and a platen holding portion 56B. Each of the device holding portion 56A and the platen holding portion 56B has a rectangular parallelepiped shape. Each of the device holding portion 56A and the platen holding portion 56B has two through holes penetrating in the front-rear direction. The guide rails 52A and 52B are inserted through the respective two through holes of the device holding portion 56A. The device holding portion 56A is supported to be movable in the front-rear direction with respect to the guide rails 52A and 52B. The guide rails 52C and 52D are inserted through the respective two through holes of the platen holding portion 56B. The platen holding portion 56B is supported to be movable in the front-rear direction with respect to the guide rails 52C and 52D.

The device holding portion 56A has four through holes 57 penetrating in the up-down direction. A bolt 57A is inserted through each through hole 57 downward. The four bolts 57A connect the printing device 1 to the device holding portion 56A. A cutout portion 58 is provided at a rear end portion of the device holding portion 56A. The cutout portion 58 is formed in a central portion of a lower surface of the device holding portion 56A in a left-right direction. On the other hand, the platen holding portion 56B includes an upper surface having a flat plate shape, and holds the platen facing the thermal head 7A of the printing device 1 in a case where printing is performed. The platen holding portion 56B is not connected to the printing device 1, and the printing device 1 and the platen are held independently in the up-down direction with a predetermined gap between the printing device 1 and the platen. The printing device 1 is held by the guide rails 52A and 52B via the device holding portion 56A. The printing device 1 moves in the front-rear direction (arrow Y2) as the device holding portion 56A moves in the front-rear direction with respect to the guide rails 52A and 52B. Similarly, the platen is held by the guide rails 52C and 52D via the platen holding portion 56B. The platen moves in the front-rear direction as the platen holding portion 56B moves in the front-rear direction with respect to the guide rails 52C and 52D.

<Ribbon Cartridge 9>

Figure 4:
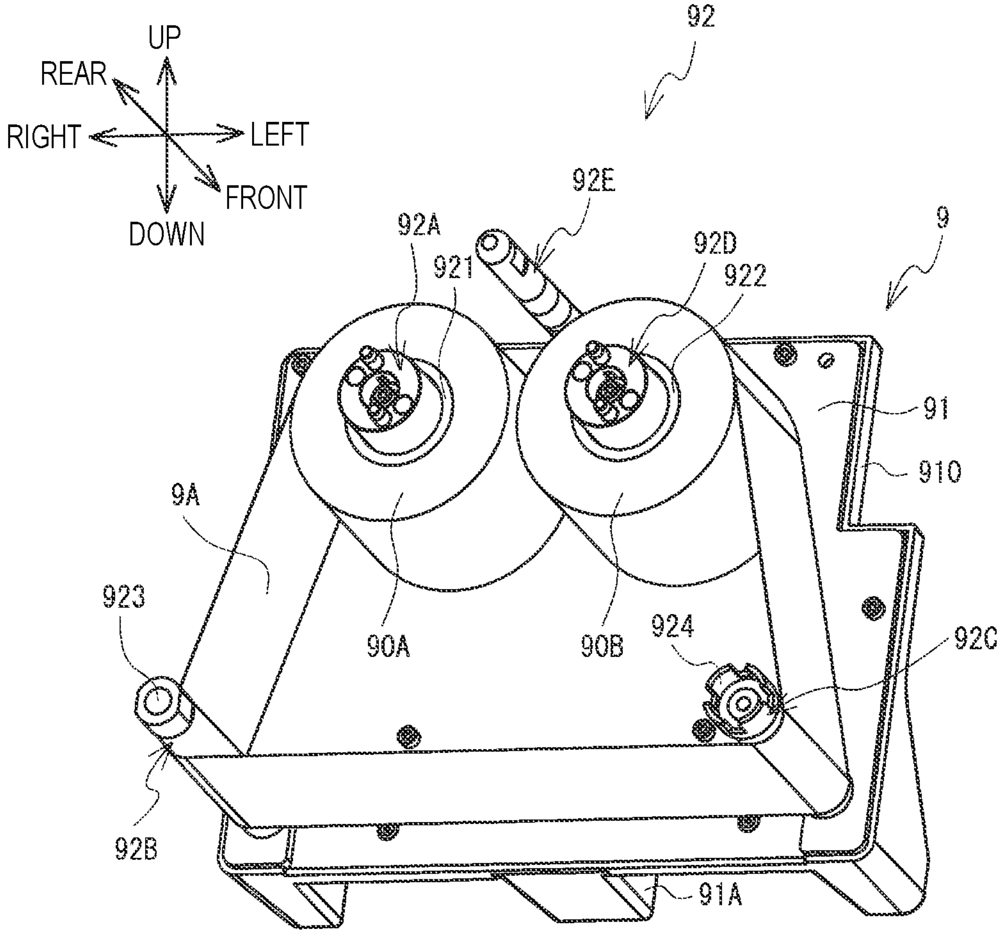
FIG. 4 is a perspective view of the ribbon cartridge 9.

As shown in FIGS. 3 and 4, the ribbon cartridge 9 includes a base portion 91 and shafts 92A to 92E (see FIG. 4, hereinafter, collectively referred to as a "shaft 92"). The base portion 91 has a substantially square plate shape. A cutout 910 is formed in an upper left corner portion of the base portion 91. As shown in FIG. 3, a handle 91A extending in the up-down direction is provided on a front surface of the base portion 91 and at a center of the base portion 91 in the left-right direction. As shown in FIG. 4, the shafts 92A to 92E each extend rearward from a rear surface of the base portion 91. The shafts 92A to 92D each have a columnar shape and are spindles rotatable about a rotation shaft extending in the front-rear direction. The shaft 92E has a columnar shape and is fixed to the base portion 91.

The shaft 92A is provided on an upper side, with respect to a center of the base portion 91, in the up-down direction and on a right side, with respect to the center of the base portion 91, in the left-right direction. The shaft 92D is provided on the upper side, with respect to the center of the base portion 91, in the up-down direction and on a left side, with respect to the center of the base portion 91, in the left-right direction. The shafts 92A and 92D are arranged in the left-right direction. A spool 921 to which one end side of the ink ribbon 9A is connected is mounted on the shaft 92A. A spool 922 to which an other end side of the ink ribbon 9A is connected is mounted on the shaft 92D. The ink ribbon 9A is wound in a roll shape around each of the spool 921 mounted on the shaft 92A and the spool 922 mounted on the shaft 92D. Hereinafter, the ink ribbon 9A wound around the spool 921 in a roll shape is referred to as the "ribbon roll 90A". The ink ribbon 9A wound around the spool 922 in a roll shape is referred to as a "ribbon roll 90B". As the spools 921 and 922 rotate, the ink ribbon 9A is fed out from the ribbon roll 90A and wound around the ribbon roll 90B.

The shaft 92B is provided on a lower right corner of the base portion 91. A hole 923 is formed in a tip end of the shaft 92B. The shaft 92C is provided on a lower left corner of the base portion 91. An engaging gear 924 is provided on a tip end of the shaft 92C. The ink ribbon 9A stretched between the spools 921 and 922 comes into contact with a part of a peripheral surface of each of the shafts 92B and 92C. The shaft 92E is provided on an upper end portion of the base portion 91 and at the center of the base portion 91 in the left-right direction.

The ribbon cartridge 9 is attachable to and detachable from the printing device 1. For example, as shown in FIG. 3, a user grips the handle 91A of the ribbon cartridge 9 and slides the ribbon cartridge 9 forward with respect to the printing device 1 (arrow Y3). Accordingly, the ribbon cartridge 9 is detached from the printing device 1. On the other hand, for example, the user grips the handle 91A of the ribbon cartridge 9 and slides the ribbon cartridge 9 rearward with respect to the printing device 1 (arrow Y4). Accordingly, the ribbon cartridge 9 is mounted on the printing device 1.

<Overview of Printing Device 1>

As shown in FIG. 3, the printing device 1 includes a housing 11. The housing 11 includes a first housing 12 and a second housing 13. The first housing 12 covers an area, on a front side with respect to a base plate 21 (see FIG. 5) that will be described later, of the printing device 1. This area accommodates a mounting portion 22 (see FIG. 5), the thermal head 7A (see FIG. 5), a moving mechanism 7B (see FIG. 5), a relay board 42 (see FIG. 6), and the like, which will be described later. The second housing 13 covers an area, on a rear side with respect to the base plate 21, of the printing device 1. This area accommodates a motor 31 (see FIG. 10), a cover 6 (see FIG. 11), a control board 41 (see FIG. 12), and the like, which will be described later.

As shown in FIGS. 3 and 5, the first housing 12 includes partial housings 12U, 12L, 12R, 12B, and 12C each having a plate shape. The partial housing 12U is orthogonal to the up-down direction and extends in the left-right direction.

The partial housing 12L is orthogonal to the left-right direction and extends downward from a left end portion of the partial housing 12U. The partial housing 12B is orthogonal to the up-down direction and extends rightward from a lower end portion of the partial housing 12L. The partial housing 12R is orthogonal to the left-right direction and extends downward from a right end portion of the partial housing 12U. The partial housing 12C is orthogonal to the up-down direction and extends leftward from a lower end portion of the partial housing 12R. As shown in FIG. 5, rear end portions of the partial housings 12U, 12L, 12R, 12B, and 12C are connected to the base plate 21, which will be described later.

Front end portions of the partial housings 12U, 12L, 12R, 12B, and 12C form an opening 12P. The ribbon cartridge 9 (see FIG. 4) is mounted on the printing device 1 by being inserted inside the first housing 12 through the opening 12P of the first housing 12. A shape of the base portion 91 (see FIG. 4) of the ribbon cartridge 9 is substantially the same as a shape of the opening 12P. Hereinafter, an area inside the first housing 12 where the ribbon cartridge 9 mounted on the printing device 1 is disposed is referred to as a mounting area 90. A right end portion of the partial housing 12B and a left end portion of the partial housing 12C form an opening 12Q. The thermal head 7A, which will be described later, heats the ink ribbon 9A (see FIG. 4) of the mounted ribbon cartridge 9 to perform printing in a state of protruding downward from the opening 12Q.

As shown in FIGS. 2, 3, and 5, the second housing 13 includes partial housings 13U (see FIG. 3), 13L (see FIG. 3), 13R (see FIG. 5), 13B (see FIG. 5), and 13S (see FIG. 2) each having a plate shape. As shown in FIG. 2, the partial housing 13S has a square shape and is orthogonal to the front-rear direction. As shown in FIGS. 3 and 5, the partial housing 13U is orthogonal to the up-down direction and extends forward from an upper end portion of the partial housing 13S. The partial housing 13L is orthogonal to the left-right direction and extends forward from a left end portion of the partial housing 13S. The partial housing 13L is located on a right side with respect to the partial housing 12L of the first housing 12. The partial housing 13R is orthogonal to the left-right direction and extends forward from a right end portion of the partial housing 13S. The partial housing 13B is orthogonal to the up-down direction and extends forward from a lower end portion of the partial housing 13S.

Front end portions of the partial housings 13U, 13R, and 13B are connected to the base plate 21, which will be described later. As shown in FIG. 3, an opening 13P is formed substantially at a center of the partial housing 13U in the left-right direction. A fan 81, which will be described later, is exposed from the opening 13P. An opening 13Q is formed in a front end portion of the partial housing 13L. A part of the cover 6, which will be described later, is exposed to the outside through the opening 13Q from the inside of the second housing 13.

<Base Plate 21>

As shown in FIGS. 5 to 7, the base plate 21 of the printing device 1 has a substantially square plate shape. The base plate 21 is orthogonal to the front-rear direction. The base plate 21 includes the mounting portion 22 (22A to 22E), the thermal head 7A, the moving mechanism 7B, and the like.

The mounting portion 22 is provided on a front surface of the base plate 21. In a case where the ribbon cartridge 9 (see FIG. 4) is mounted on the printing device 1, the shafts 92A to 92E (see FIG. 4) of the ribbon cartridge 9 are connected to the mounting portions 22A to 22E, respectively. The mounting portion 22A is provided on an upper side, with respect to a center of the base plate 21, in the up-down direction and on a right side, with respect to a center of the base plate 21, in the left-right direction. The mounting portion 22D is provided on the upper side, with respect to the center of the base plate 21, in the up-down direction and on a left side, with respect to the center of the base plate 21, in the left-right direction. The mounting portions 22A and 22D each have a circular shape and are arranged in the left-right direction. For example, in a case where the ribbon cartridge 9 is mounted on the printing device 1, the ribbon roll 90A wound around the spool 921 (see FIG. 4) connected to the shaft 92A is mounted on the mounting portion 22A. The ribbon roll 90B (see FIG. 4) wound around the spool 922 connected to the shaft 92D is mounted on the mounting portion 22D.

The mounting portion 22B is provided on a lower right corner of the base plate 21. The mounting portion 22B has a columnar shape and extends forward from the base plate 21. The mounting portion 22C is provided on a lower left corner of the base plate 21. The mounting portion 22C has a cylindrical shape and includes an engaging gear that is not shown inside the mounting portion 22C. The mounting portion 22E is provided on an upper end portion of the base plate 21 and at the center of the base plate 21 in the left-right direction. The mounting portion 22E has a tubular shape and extends forward from the base plate 21. In a case where the ribbon cartridge 9 is mounted on the printing device 1, the mounting portion 22B is inserted through the hole 923 (see FIG. 4) of the shaft 92B. The engaging gear of the mounting portion 22C is engaged with the engaging gear 924 (see FIG. 4) of the shaft 92C. The shaft 92E is inserted through a tubular interior of the mounting portion 22E.

A rotation shaft of a motor 31A (see FIG. 9), which will be described later, is connected to the mounting portion 22A from behind. The mounting portion 22A rotates in accordance with rotation of the motor 31A. A rotation shaft of a motor 31B (see FIG. 9), which will be described later, is connected to the mounting portion 22D. The mounting portion 22D rotates in accordance with rotation of the motor 31B. In a case where the mounting portions 22A and 22D rotate in a state where the shafts 92A to 92E (see FIG. 4) of the ribbon cartridge 9 are connected to the mounting portions 22A to 22E, respectively, the ink ribbon 9A (see FIG. 4) of the ribbon cartridge 9 is guided in a state of coming into contact with the shafts 92B and 92C between the spools 921 and 922 (see FIG. 4) to be conveyed in the printing device 1.

<Thermal Head 7A>

As shown in FIGS. 5 to 7, the thermal head 7A is provided on a lower end portion of the front surface of the base plate 21 and at a portion between the mounting portions 22B and 22C. The thermal head 7A is supported to be movable in the up-down direction and the left-right direction with respect to the base plate 21. The thermal head 7A is a line thermal head. The thermal head 7A includes a base portion 71, a rail 72, and a plurality of heating elements 71A. The thermal head 7A is connected to a belt 32A connected to a pulley 32 connected to the rotation shaft of the motor 31B (see FIG. 10), which will be described later. The thermal head 7A moves in the left-right direction as the belt 32A is rotated by the motor 31B.

The base portion 71 has an elongated plate shape and extends in the front-rear direction. The base portion 71 is inclined with respect to a direction orthogonal to the up-down direction. The base portion 71 is biased upward by a spring 71B (see FIG. 6). The rail 72 extending in the front-rear direction is provided on an upper side of the base portion 71.

The plurality of heating elements 71A arranged in the front-rear direction are provided on a lower side of the base portion 71. The plurality of heating elements 71A come into contact, from above, with a portion of the ink ribbon 9A (see FIG. 4) fed out from the ribbon roll 90A of the ribbon cartridge 9 in accordance with the rotation of the mounting portions 22A and 22D, the portion being stretched between the shafts 92B and 92C (see FIG. 2). The plurality of heating elements 71A sandwich the ink ribbon 9A and the printing medium between the plurality of heating elements 71A and the platen held on the upper surface of the platen holding portion 56B. The plurality of heating elements 71A heat the ink ribbon 9A while pressing the ink ribbon 9A against the printing medium. Accordingly, the thermal head 7A transfers an ink of the ink ribbon 9A to the printing medium to perform the printing.

<Moving Mechanism 7B>

The moving mechanism 7B is provided on the front surface of the base plate 21 and above the thermal head 7A. The moving mechanism 7B is a mechanism for moving the thermal head 7A in the up-down direction and the left-right direction. The moving mechanism 7B includes a pair of support portions 75, guide rails 76A, 76B, and 76C, and a swinging member 77. The pair of support portions 75 are provided above the mounting portions 22B and 22C, and are separated from each other in the left-right direction. The pair of support portions 75 are supported by the base plate 21 to be swingable about a rotation shaft extending in the left-right direction. The guide rails 76A, 76B, and 76C each have a columnar shape and extend in the left-right direction. The guide rails 76A, 76B, and 76C are bridged between the pair of support portions 75.

As shown in FIGS. 5, 7, and 8, an arm 33 is connected to the guide rail 76B. The arm 33 extends rearward from the guide rail 76B, passes through an opening 21A formed in the base plate 21, and extends to the rear of the base plate 21. The opening 21A allows the front and the rear of the base plate 21 to communicate with each other. A filter 210 for preventing passage of dust and dirt is provided in the opening 21A. The filter 210 is flexible and does not interfere with movement of the arm 33. As shown in FIG. 8, a rear end portion of the arm 33 is connected to a crank 34 connected to a rotation shaft of a motor 31C, which will be described later. The arm 33 is driven as the crank 34 is rotated by the motor 31C. The pair of support portions 75 and the guide rails 76A, 76B, and 76C swing as the arm 33 is driven.

As shown in FIGS. 5 to 8, the swinging member 77 is supported to be movable in the left-right direction with respect to the guide rail 76C. As shown in FIGS. 6 and 8, the swinging member 77 includes a first portion 77A extending obliquely downward and forward from the guide rail 76C, and a second portion 77B extending obliquely upward and forward from the guide rail 76C. A pulley 77C is rotatably supported at a tip end of the first portion 77A. The pulley 77C comes into contact with the rail 72 of the thermal head 7A from above. The pulley 77C moves the swinging member 77 in the left-right direction in accordance with the movement of the thermal head 7A in the left-right direction. A rotational body 77D is rotatably supported at a tip end of the second portion 77B. The rotational body 77D comes into contact with the guide rail 76A from the front.

In a case where the motor 31C rotates, the swinging member 77 swings in conjunction with swinging of the pair of support portions 75 and the guide rails 76A, 76B, and 76C. As shown in FIG. 8, in a case where the swinging member 77 swings in a counterclockwise direction as viewed from a right side, the first portion 77A of the swinging member 77 pushes the thermal head 7A downward via the pulley 77C. The thermal head 7A moves downward against a biasing force of the spring 71B. In a state where the thermal head 7A moves to a lowest position, the plurality of heating elements 71A of the thermal head 7A slightly protrude downward from the opening 12Q (see FIG. 5) of the housing 11. On the other hand, in a case where the swinging member 77 swings in a clockwise direction as viewed from the right side, the thermal head 7A moves upward in accordance with the biasing force of the spring 71B. In a state where the thermal head 7A moves to an uppermost position, the plurality of heating elements 71A of the thermal head 7A are located above the opening 12Q of the housing 11.

<Relay Board 42>

As shown in FIG. 6, the relay board 42 is provided on a left side of the base plate 21. The relay board 42 extends in a direction orthogonal to the base plate 21, that is, in a direction orthogonal to the left-right direction. The relay board 42 is a printed circuit board on which various devices are mounted. Hereinafter, for ease of description, the relay board 42 may be described as being divided into a first portion 42A and a second portion 42B. The first portion 42A is a portion on an upper side, with respect to a center of the relay board 42, in the up-down direction. The second portion 42B is a portion on a lower side, with respect to the center of the relay board 42, in the up-down direction.

The first portion 42A has a rectangular shape elongated in the front-rear direction. As shown in FIGS. 7 and 9, positions of front end portions of the first portion 42A and the partial housing 12L of the first housing 12 in the front-rear direction coincide with each other. As shown in FIG. 9, a rear end portion of the first portion 42A is located behind the base plate 21. That is, the first portion 42A extends from a front end portion of the first housing 12 to a position behind the base plate 21. A portion of the first portion 42A disposed on a front side with respect to the base plate 21 is located on a left side of the mounting area 90 where the ribbon cartridge 9 is to be mounted.

As shown in FIG. 7, an interface portion 43 is provided on the front end portion of the first portion 42A. The interface portion 43 includes a USB connector 43A and a push button 43B on a front surface of the interface portion 43. A USB memory that is not shown is connected to the USB connector 43A. The push button 43B is operated in a case where an instruction to the printing device 1 is input. The first portion 42A transmits, to the control board 41 (see FIG. 12) that will be described later, an electric signal received from the USB memory connected to the USB connector 43A and an electric signal indicating that the push button 43B is operated. The interface portion 43 is provided with a plurality of indicators formed of LEDs, and an operation state of the printing device 1, a remaining amount of the ribbon, and the like can be indicated to the user by colors and lighting patterns of the indicators. As shown in FIG. 3, the interface portion 43 is adjacent to the cutout 910 of the base portion 91 in a state where the ribbon cartridge 9 (see FIG. 4) is mounted. Therefore, the front surface of the interface portion 43 is not covered by the base portion 91 even in a case where the ribbon cartridge 9 is mounted.

As shown in FIG. 6, the second portion 42B extends downward from a lower end portion of the first portion 42A and a center of the first portion 42A in the front-rear direction. A front end portion of the second portion 42B is located behind the front end portion of the first portion 42A. A rear end portion of the second portion 42B is located behind the base plate 21 (see FIG. 9). As shown in FIG. 7, an encoder 74A is provided on a right surface of the second portion 42B. The encoder 74A measures a rotation amount of the pair of support portions 75 of the moving mechanism 7B. A CPU mounted on the control board 41, which will be described later, can detect a movement amount of the thermal head 7A in the up-down direction, based on the rotation amount detected by the encoder 74A. Further, an LED 74B is provided on the right surface of the second portion 42B. The LED 74B irradiates the area on the front side with respect to the base plate 21 with light. Due to the irradiation with the light, the vicinity of the mounting portion 22 becomes bright. Accordingly, the user can visually recognize a remaining amount of the ink ribbon 9A of the ribbon cartridge 9 and an operation state of the printing device 1 through a window that is not shown provided in the base portion 91. By turning on the LED 74B at the time of attaching/detaching the ribbon cartridge 9, it is also possible to help an attachment/detachment operation of the ribbon cartridge 9.

As shown in FIGS. 5 and 6, a portion of the relay board 42 located on the front side than the base plate 21 is covered with a cover 16 except for a left surface of the relay board 42. As shown in FIG. 5, a part of the relay board 42 is accommodated in a space between the partial housing 12L of the first housing 12 and the cover 16. A part of the cover 16 is transmissive and allows the light from the LED 74B to transmit through the part of the cover 16.

As shown in FIGS. 10 to 12, a portion of the relay board 42 located on the rear side with respect to the base plate 21 is covered with the cover 6, which will be described later. As shown in FIG. 9, a rear end portion of the relay board 42 is located on a front side than a rear end portion of the second housing 13. As shown in FIG. 10, connectors 45A, 45B, and 45C are provided on the rear end portion of the relay board 42.

<Motor 31>

As shown in FIG. 10, motors 31A to 31D (hereinafter, collectively referred to as the "motor 31") are provided on a rear surface of the base plate 21. As shown in FIG. 9, the motor 31A is connected to a portion of the rear surface of the base plate 21 that is a rear side with respect to the mounting portion 22A (see FIGS. 5 to 7) on the front surface of the base plate 21. The motor 31D is connected to a portion of the rear surface of the base plate 21 that is a rear side with respect to the mounting portion 22D (see FIGS. 5 to 7) on the front surface of the base plate 21. The motors 31A and 31D are arranged in the left-right direction. The motor 31A is disposed on a right side with respect to the motor 31D. Rotation shafts of the motors 31A and 31D penetrate the base plate 21 from the rear surface toward the front surface, and are connected to the mounting portions 22A and 22D on the front surface, respectively. The motor 31A rotates the mounting portion 22A, and the motor 31D rotates the mounting portion 22D. A heat insulator 30A is provided between the motor 31A and the base plate 21. A heat insulator 30D is provided between the motor 31D and the base plate 21. The heat insulators 30A and 30D prevent the heat of the motors 31A and 31D from being transmitted to the base plate 21, respectively.

As shown in FIG. 10, the motor 31B is connected to a lower side of the rear surface of the base plate 21 with respect to the motor 31A. The motor 31C is connected to a lower side, with respect to the motor 31D, of the rear surface of the base plate 21. As shown in FIG. 7, the rotation shaft of the motor 31B penetrates the base plate 21 from the rear surface toward the front surface, and is connected to the pulley 32 on the front side with respect to the base plate 21. The motor 31B rotates the pulley 32 to move the thermal head 7A in the left-right direction. As shown in FIG. 8, the rotation shaft of the motor 31C extends rightward and is connected to the crank 34. The motor 31C rotates the crank 34 to move the thermal head 7A in the up-down direction.

<Control Board 41>

As shown in FIG. 12, the control board 41 is disposed behind the motor 31 (see FIG. 10). The control board 41 is a printed circuit board on which various devices are mounted. The control board 41 is fixed, by spacers 41A, to a position separated rearward from the base plate 21. The control board 41 is orthogonal to the front-rear direction and parallel to the base plate 21. The CPU for controlling the motor 31, encoders for detecting rotation amounts of the respective motors 31A and 31D, and the like are mounted on the control board 41. The encoder for detecting the rotation amount of the motor 31A is provided on a front surface of the control board 41 and behind a rotation shaft 33A (see FIGS. 10 and 11) of the motor 31A. The encoder for detecting the rotation amount of the motor 31D is provided on the front surface of the control board 41 and behind a rotation shaft 33D (see FIGS. 10 and 11) of the motor 31D. The control board 41 is electrically connected to the relay board 42 by an FPC that is not shown.

<Cover 6>

As shown in FIG. 11, the cover 6 is disposed behind the base plate 21 and forward of the control board 41 (see FIG. 12). The cover 6 covers, from behind, the motors 31A to 31D and a part of the rear end portion of the relay board 42.

As shown in FIGS. 11 and 13, the cover 6 includes partial covers 61S, 61U, 61B, 61R, 61L, 62U, 62S, 62B, and 62L each having a plate shape. The partial cover 61S has irregularities, and a main component of the partial cover 61S is orthogonal to the front-rear direction. The partial cover 61S is disposed between the motor 31 and the control board 41. The partial covers 61U, 61R, 61L, and 61B extend forward from an upper end portion, a right end portion, a left end portion, and a lower end portion of the partial cover 61S, respectively. The partial cover 62S extends leftward from a front end portion of the partial cover 61L and is orthogonal to the front-rear direction. The partial covers 62U, 62B, and 62L extend forward from an upper end portion, a lower end portion, and a left end portion of the partial cover 62S, respectively. The partial cover 62S is provided with a partition wall 62R extending forward from a front surface of the partial cover 62S. The partition wall 62R is orthogonal to the left-right direction and extends in the up-down direction. Rear end portions of the partial covers 61U, 61R, 61B, 62U, 62L, and 62B and the partition wall 62R are connected to the base plate 21.

The cover 6 partitions the area covered by the second housing 13 (see FIGS. 2 and 3, and the like) into a first area 66A, a second area 66B, and a third area 66C. The first area 66A is an area surrounded by the partial covers 61S, 61U, 61R, and 61B and the partition wall 62R. The motors 31A to 31D are disposed in the first area 66A. The third area 66C is an area surrounded by the partial covers 62S, 62U, 62L, 62B and the partition wall 62R. A part of the rear end portion of the relay board 42 is disposed in the third area 66C. As shown in FIG. 9, the second area 66B is an area other than the first area 66A and the third area 66C in the area covered by the second housing 13 (see FIGS. 2 and 3, and the like).

The control board 41 is disposed in the second area 66B. The first area 66A and the second area 66B are arranged in the front-rear direction.

As shown in FIG. 13, an opening 61P is provided in the partial cover 61U. Through holes 63A and 63D are provided in the partial cover 61S. As shown in FIG. 11, the rotation shaft 33A of the motor 31A is inserted through the through hole 63A from the front and protrudes rearward. The rotation shaft 33D of the motor 31D is inserted through the through hole 63D from the front and protrudes rearward. As shown in FIG. 13, through holes 64A, 64B, and 64C are provided in the partial cover 62S. As shown in FIGS. 11 and 12, the connectors 45A and 45B provided on the relay board 42 are inserted through the through holes 64A and 64B from the front and protrude rearward, respectively. The connector 45C provided on the relay board 42 is exposed from the through hole 64C.

<Fan Unit 8>

As shown in FIG. 3, a fan unit 8 is disposed in the opening 13P of the partial housing 13U corresponding to an upper end portion of the second housing 13. As shown in FIG. 6, the fan unit 8 is fixed to the upper end portion of the base plate 21 and at the center of the base plate 21 in the left-right direction, and protrudes rearward. As shown in FIG. 11, the fan unit 8 is located above the opening 61P provided in the partial cover 61U of the cover 6. The fan unit 8 includes the fan 81 and a fixing portion 82.

The fan 81 includes a plurality of propellers and a hub to which the plurality of propellers are connected, and rotates about a rotation shaft extending in the up-down direction. A motor is built in the fan 81. In a case where the fan 81 rotates, air in the first area 66A of the cover 6 is discharged to the outside of the printing device 1 through the opening 61P of the cover 6 and the opening 13P (see FIG. 9) of the second housing 13.

The fixing portion 82 has a C-shape when viewed from above, and covers a left side, a right side, and a rear side of the fan 81. The fixing portion 82 rotatably supports the fan 81 and fixes the fan 81 to the base plate 21. The fixing portion 82 includes a rectangular plate body 82P on an upper surface of the fixing portion 82. A front end portion of the plate body 82P is fixed to an upper side of the upper end portion of the base plate 21. Screw holes 82A extending in the up-down direction are formed at respective four corners of the base plate 21. A filter 85 for preventing passage of dust and dirt is provided in an opening inside the plate body 82P.

As shown in FIG. 2, the four bolts 57A inserted through the four through holes 57 of the device holding portion 56A are screwed into the respective four screw holes 82A of the fixing portion 82 shown in FIG. 3. The printing device 1 is held by the device holding portion 56A by connecting the device holding portion 56A to the fixing portion 82 with the four bolts 57A. The device holding portion 56A covers the fan 81 from above in a state of being connected to the fixing portion 82.

<Overview of Printing Operation>

The ribbon cartridge 9 is mounted on the printing device 1. In a state where the printing device 1 is held by the moving mechanism 5 with the holding portion 56, a printing surface of the printing medium conveyed by the external device and the thermal head 7A of the printing device 1 face each other in the up-down direction. Further, a platen roller that is not shown is disposed on a side opposite to the printing device 1 with respect to the printing medium.

The fan unit 8 is powered on, and the fan 81 starts to rotate. As shown in FIG. 8, the fan 81 discharges, to the outside, the air in the first area 66A of the cover 6 from an upper end portion of the housing 11 (arrow Y13). The discharged air passes through a gap formed between the fan unit 8 and the cutout portion 58 of the device holding portion 56A connected to the fixing portion 82 of the fan unit 8. Accordingly, an upward air flow is formed inside the first area 66A (arrow Y12). In accordance with the air flow, air outside the housing 11 is taken into an area inside the housing 11 and on the front side of the base plate 21 through the opening 12Q (see FIG. 5) in the lower end portion of the housing 11 (arrow Y10). Further, the air taken into the area on the front side of the base plate 21 passes through the opening 21A of the base plate 21 to the rear side and flows into the first area 66A (arrow Y11).

In a case where a printing action by the printing device 1 is started, the mounting portions 22A and 22D rotate in accordance with driving of the motors 31A and 31D, respectively. Accordingly, the shafts 92A and 92D of the ribbon cartridge 9 connected to the respective mounting portions 22A and 22D also rotate. The ink ribbon 9A is fed out from the ribbon roll 90A of the spool 921 mounted on the shaft 92A, and is wound around the ribbon roll 90B of the spool 922 mounted on the shaft 92D. A portion of the ink ribbon 9A between the shafts 92B and 92C moves in the same direction as the conveyance direction of the printing medium.

The motors 31A and 31D drive to generate heat. On the other hand, due to driving of the fan 81 of the fan unit 8, the air flow (arrow Y12) is generated inside the first area 66A. The air flow cools the motors 31A and 31D.

In a case where a conveyance speed of the ink ribbon 9A is increased to a predetermined speed, the motor 31C is driven, and the thermal head 7A is lowered to protrude below the opening 12Q. The thermal head 7A comes into contact with the platen roller from above via the ink ribbon 9A and the printing medium. The ink ribbon 9A is pressed against the printing surface of the printing medium in accordance with the movement of the thermal head 7A. The heating elements 71A of the thermal head 7A generate heat, and the ink of the ink ribbon 9A is transferred to the printing surface of the printing medium. As described above, printing by the printing device 1 is performed.

Operations and Effects of the Present Embodiment

Various operations on the thermal head 7A of the printing device 1 (for example, replacement and cleaning of the thermal head 7A) may be performed. In this case, the printing medium and the platen roller are arranged below the printing device 1, and thus usually, an operator often accesses the thermal head 7A from above the printing device 1 to perform various operations. Here, in the printing device 1, the relay board 42 is disposed on the left side of the base plate 21, and the relay board 42 is not disposed above the thermal head 7A. Therefore, the printing device 1 can prevent the relay board 42 from becoming an obstacle in a case where the operator accesses the thermal head 7A from above to perform various operations. Therefore, the printing device 1 can facilitate various operations performed on the thermal head 7A by the operator.

The relay board 42 extends from the front end portion of the first housing 12 to the rear side with respect to the base plate 21. Therefore, the printing device 1 can use the relay board 42 as a transmission path of an electric signal transmitted from the front end portion of the first housing 12 to the control board 41 behind the base plate 21. In this case, it is not necessary to use a signal line or the like for transmitting an electric signal, and thus it is possible to reduce the cost of the printing device 1.

The rear end portion of the relay board 42 is located on the front side than the rear end portion of the second housing 13. Therefore, in the printing device 1, a connector on a cable side connected to the connectors 45A and 45B of the relay board 42 can be disposed in a portion between the rear end portion of the second housing 13 and the rear end portion of the relay board 42. In this case, it is possible to reduce a rearward protrusion, from the rear end portion of the second housing 13, of the connector on the cable side. Therefore, the printing device 1 can reduce a space in the front-rear direction required at the time of printing.

The printing device 1 includes the cover 16 that covers the relay board 42. In this case, the cover 16 can reduce dust, dirt, and the like adhering to the relay board 42.

The printing device 1 can use the relay board 42 as a transmission path for transmitting an electric signal received from a USB cable connected to the USB connector 43A of the interface portion 43. The relay board 42 is disposed on the left side with respect to the mounting area 90 of the ribbon cartridge 9, and thus the relay board 42 does not interfere with the attachment/detachment action of the ribbon cartridge 9 with respect to the printing device 1. Therefore, in a case where the ribbon cartridge 9 is attached to or detached from the printing device 1, it is not necessary to remove the USB cable from the USB connector 43A. Therefore, in the printing device 1, the ribbon cartridge 9 can be easily attached to and detached from the printing device 1 in a state where the USB cable is connected to the USB connector 43A.

The encoder 74A provided on the right surface of the second portion 42B of the relay board 42 can detect the movement amount of the thermal head 7A in the up-down direction. The printing device 1 can easily hold the encoder 74A with the relay board 42. The LED 74B provided on the right surface of the second portion 42B of the relay board 42 can irradiate the front side of the base plate 21 with light. The printing device 1 can easily hold the LED 74B with the relay board 42.

<Modifications>

The present disclosure is not limited to the above embodiment, and various modifications are possible. The relay board 42 may be provided on a right side of the base plate 21, or may be provided on both left and right sides of the base plate 21. The relay board 42 may include only the first portion 42A, and may not include the second portion 42B. Conversely, the relay board 42 may include only the second portion 42B, and may not include the first portion 42A. A front end portion of the relay board 42 may be located behind the front end portion of the first housing 12. Positions of the rear end portion of the relay board 42 and the rear end portion of the second housing 13 in the front-rear direction may coincide with each other. In this case, the connector on the cable side connected to the connectors 45A and 45B of the relay board 42 may protrude rearward than the rear end portion of the second housing 13.

The cover 16 covering a part of the relay board 42 may further cover a left side of the relay board 42. The cover 16 may be integrated with the first housing 12. The cover 16 may not be provided. The interface portion 43 may be provided on a left surface of the relay board 42.

Various sensors that measures driving amounts of various drive mechanisms connected to the base plate 21 may be mounted on the relay board 42. For example, an optical sensor that measures a ribbon amount of the ribbon rolls 90A and 90B, a contact sensor that detects whether the ribbon cartridge 9 is mounted, and the like may be mounted on the relay board 42. The number of LEDs 74B mounted on the relay board 42 is not limited to one, and may be plural. The encoder 74A and the LED 74B may not be mounted on the relay board 42.

What is claimed is:

1. A printing device comprising:

a base plate extending in a direction orthogonal to a first direction;

a mounting portion provided rotatably on a surface, which is at one side in the first direction, of the base plate, wherein a ribbon roll having an ink ribbon wound is to be mounted on the mounting portion;

a thermal head provided on the surface of the base plate, and configured to perform printing on a printing medium disposed on one side of the thermal head in a second direction orthogonal to the first direction; and a printed circuit board located on one side, with respect to the base plate, in a third direction orthogonal to the first direction and the second direction, and extending in a direction intersecting the base plate, wherein the base plate is located, in the first direction, between one end of the printed circuit board and the other end of the printed circuit board.

2. The printing device according to claim 1, further comprising:

a first housing covering the one side, in the first direction, of the base plate, the thermal head, and the printed circuit board, wherein the one end of the printed circuit board coincides with an end of the first housing in the first direction.

3. The printing device according to claim 1, further comprising:

a second housing covering an other side, in the first direction, of the base plate, wherein the other end of the printed circuit board is located, in the first direction, between an end portion of the second housing and the base plate.

4. The printing device according to claim 1, further comprising:

a cover covering the printed circuit board.

5. The printing device according to claim 2, wherein the printed circuit board is a relay board configured to relay an electric signal, the printed circuit board includes a connector to which an external interface is to be connected, the connector is provided on the one end of the printed circuit board in the first direction, and the printed circuit board is located on the one side in the third direction with respect to a mounting area where the ribbon roll mounted on the mounting portion is to be disposed.

6. The printing device according to claim 1, wherein an LED is mounted on the printed circuit board, the LED being configured to irradiate the one side, in the first direction, of the base plate with light.

* * * * *